(12) United States Patent
Sechet et al.

(10) Patent No.: US 11,818,972 B2
(45) Date of Patent: Nov. 21, 2023

(54) METHOD AND SYSTEM FOR DETERMINING AND STORING SURFACE CONDITIONS FOR A FIELD

(71) Applicant: Kverneland Group Les Landes Génusson S.A.S., Les Landes Génusson (FR)

(72) Inventors: Arnaud Sechet, Villedieu la Blouere (FR); Gaëtan Pasquier, Sainte Cécile (FR)

(73) Assignee: Kverneland Group Les Landes Génusson S.A.S., Les Landes Génusson (FR)

( * ) Notice: Subject to any disclaimer, the term of this patent is extended or adjusted under 35 U.S.C. 154(b) by 632 days.

(21) Appl. No.: 16/760,150

(22) PCT Filed: Oct. 30, 2018

(86) PCT No.: PCT/EP2018/079716
§ 371 (c)(1),
(2) Date: Apr. 29, 2020

(87) PCT Pub. No.: WO2019/086459
PCT Pub. Date: May 9, 2019

(65) Prior Publication Data
US 2020/0352077 A1      Nov. 12, 2020

(30) Foreign Application Priority Data
Oct. 30, 2017   (EP) .................................... 17199239

(51) Int. Cl.
*G01B 5/20*    (2006.01)
*G01B 5/28*    (2006.01)
*A01B 29/06*   (2006.01)

(52) U.S. Cl.
CPC ................ *A01B 29/06* (2013.01); *G01B 5/20* (2013.01); *G01B 5/28* (2013.01)

(58) Field of Classification Search
CPC ........ A01B 29/06; A01B 79/005; G01B 5/20; G01B 5/28
See application file for complete search history.

(56) References Cited

U.S. PATENT DOCUMENTS 6,199,000 B1 * 3/2001 Keller .................. A01B 79/005
                                                342/357.62
10,255,670 B1 * 4/2019 Wu ........................ H04N 7/183
(Continued)

FOREIGN PATENT DOCUMENTS

DE   102015111518 A1   1/2017
EP       2832198 A1    2/2015
(Continued)

OTHER PUBLICATIONS

International Search Report pertaining to Application No. PCT/EP2018/079716 dated Nov. 12, 2019, 9 pgs.
(Continued)

*Primary Examiner* — Yaritza Guadalupe-McCall
(74) *Attorney, Agent, or Firm* — Leason Ellis LLP (57) ABSTRACT

The disclosure refers to a method for determining and storing surface conditions for a field, comprising: moving an agricultural machine having an earth-working roller system over a field, the earth-working roller system comprising an earth-working roller assembly; detecting sensor signals for an oscillating movement of the earth-working roller assembly; detecting position data for the movement of the earth-working roller system over the field; generating a digital surface map for the field indicative of position-dependent roughness and/or leveling information, the generating comprising assigning the sensor signals to the position data; and storing the digital surface map in a data storage device.

(Continued)

Further, a system for determining and storing surface conditions for a field is provided.

11 Claims, 12 Drawing Sheets

(56) References Cited

U.S. PATENT DOCUMENTS

| | | | | |
|---|---|---|---|---|
| 11,096,323 | B2* | 8/2021 | Wolters | G05D 1/0219 |
| 11,202,402 | B2* | 12/2021 | Glovier | A01B 29/06 |
| 11,287,411 | B2* | 3/2022 | Miresmailli | A01G 25/16 |
| 11,346,832 | B2* | 5/2022 | Koch | G01N 33/246 |
| 11,369,052 | B2* | 6/2022 | Cozza | A01B 49/027 |
| 11,592,822 | B2* | 2/2023 | Vandike | G01C 21/3848 |
| 2003/0024450 | A1 | 2/2003 | Juptner | |
| 2015/0305226 | A1* | 10/2015 | Zemenchik | A01C 21/005 |
| | | | | 172/4 |
| 2018/0325015 | A1* | 11/2018 | Wolters | B60W 10/10 |
| 2020/0045873 | A1* | 2/2020 | Wolters | B60W 10/10 |
| 2020/0132658 | A1* | 4/2020 | Koch | G01N 33/246 |
| 2020/0352077 | A1* | 11/2020 | Sechet | A01B 29/06 |
| 2020/0379479 | A1* | 12/2020 | Dima | G05D 1/0223 |
| 2021/0048290 | A1* | 2/2021 | Henry | A01B 79/005 |
| 2021/0144903 | A1* | 5/2021 | Javault | G06T 7/70 |
| 2021/0360845 | A1* | 11/2021 | Wolters | A01B 69/008 |
| 2022/0113726 | A1* | 4/2022 | Vandike | G08C 17/02 |
| 2022/0113729 | A1* | 4/2022 | Vandike | A01D 41/141 |
| 2022/0201921 | A1* | 6/2022 | Sasamoto | A01D 41/127 |
| 2022/0232816 | A1* | 7/2022 | Vandike | A01M 7/0089 |
| 2023/0161347 | A1* | 5/2023 | Vandike | B60K 35/00 |
| | | | | 701/50 |

FOREIGN PATENT DOCUMENTS

| | | |
|---|---|---|
| EP | 2759187 B1 | 1/2016 |
| WO | 2012102667 A1 | 8/2012 |
| WO | 2017158006 A2 | 9/2017 |

OTHER PUBLICATIONS

European Search Report pertaining to Application No. 17199239.9 dated Apr. 16, 2018, 7 pgs.

* cited by examiner

METHOD AND SYSTEM FOR DETERMINING AND STORING SURFACE CONDITIONS FOR A FIELD

The invention relates to a method and a system for determining and storing surface conditions for a field.

BACKGROUND

Earth-working roller systems which may also be referred to soil-working roller systems may be provided with different kinds of agricultural machines. In general, the earth-working roller system is used for applying rollers to soil or earth. There are earth-working roller systems comprising an earth-working roller assembly having a first earth-working roller member and a second earth-working roller member, wherein the earth-working roller members are supported by a drawbar fixedly connected to support members receiving the first and second earth-working roller members. Document EP 2 759 187 B1 discloses an earth-working roller system in which the earth-working roller assembly is enabled for pivotal movement relative to a frame member.

An earth-working roller system is also disclosed in EP 2 832 198 A1.

Document US 2003/0024450 A1 discloses a cultivating and seeding machine is provided with a seeding unit and a tillage device and/or a land roller. Data records containing information about some prescribed pressure of a tillage device, the prescribed pressure of a land roller, and a prescribed sowing depth may be read out from a target value map in a data memory when tilling a field using information generated by a satellite receiver antenna about the correct location. A recalculation for compensating an offset between the position of satellite receiver antenna and a cultivating combination or its working elements is also possible. Actuators are controlled in accordance with the data records by a control and valve device. Constant contact with the ground and a uniform, optimally adjusted soil pressure are possible by controlling the pressure of the land roller. Actuators may be caused to lift up the working elements of the cultivating combination, that is, the tillage device, the land roller and a seeding device at headlands at edges of a field.

Document DE 10 2015 111 518 A1 discloses a soil cultivation device with at least one soil cultivation tool, a measuring device and a storage unit coupled to the measuring device for storing and processing the data originating from the measuring device is thereby presented characterized in that the measuring device comprises at least one sensor arranged on several or each tilling tool, the measuring signals of which are a measure of interference affecting the soil tillage implement and means for data exchange with a global position detection system.

Document WO 2017/158006 A2 discloses a system measures the roughness of the ground surface over which an agricultural implement passes as measured in the direction of travel.

Document WO 2012/102667 A1 discloses an agricultural implement comprises at least one soil-working tool and at least one tool with mainly a levelling function, arranged to work soil across which the agricultural implement is moved.

Document EP 2 759 187 B1 discloses a drawbar apparatus for coupling an earth-working tool to a frame of an agricultural implement, the drawbar apparatus comprising: a drawbar and a joint comprising a first bracket comprising a protrusion, the protrusion defining a first aperture, the first bracket coupled to one of the second portion of the drawbar and the earth-working tool, a second bracket defining a channel configured to receive the protrusion and defining a second aperture and third aperture and a fastener positioned through the apertures and coupling the brackets; wherein the protrusion of the joint is configured to move laterally in the channel along the longitudinal axis of the fastener.

Document EP 2 832 198 A1 discloses ground roller unit having at least two successively arranged and rolling on the ground follower rollers, one of which is formed as a main roller and the at least one further as a secondary roller, wherein the main roller rotatably arranged in a main support frame and the at least one further secondary roller is rotatably arranged in an additional frame, wherein the additional frame is arranged on the main support frame by means of connecting elements.

SUMMARY

It is an object of the present invention to provide an earth-working roller system for an agricultural machine which allows for improved operation of the earth-working roller system and/or other agricultural machine.

For solving the object, a method and a system for determining and storing surface conditions for a field according to the claims 1 and 11 are provided. Embodiments are the subject of dependent claims.

According to an aspect, a method for determining and storing surface conditions for a field is provided, the method comprising: moving an agricultural machine having an earth-working roller system over a field, the earth-working roller system comprising an earth-working roller assembly; detecting sensor signals for a movement of the earth-working roller assembly; detecting position data for the movement of the earth-working roller system over the field; generating a digital surface map for the field indicative of position-dependent roughness and/or leveling information, the generating comprising assigning the sensor signals to the position data; and storing the digital surface map in a data storage device.

According to another aspect, a system for determining and storing surface conditions for a field may be provided, the system comprising: an agricultural machine having an earth-working roller system over a field, the earth-working roller system comprising an earth-working roller assembly; a measurement system, comprising a sensor system; and a data storage device. The measurement system is adapted to detect sensor signals for a movement of the earth-working roller assembly while the agricultural machine is moving over a field; detect position data for the movement of the earth-working roller system over the field; generate a digital surface map for the field indicative of position-dependent roughness and/or leveling information, the generating comprising assigning the sensor signals to the position data; and store the digital surface map in the data storage device.

The digital (surface) map for the field indicative of position-dependent (soil) roughness and/or leveling information may be used for controlling operation of another agricultural machine in dependence on the surface (soil) roughness/leveling, such operation may be referred to as position-dependent operation control based on the digital map.

The surface map may be a 2D perspective representation of a 3-dimensional surface. The surface map represents a real-world entity, namely the surfaces of the filed over which the agricultural machine having the earth-working roller system is moved.

The detecting of the sensor signals may comprise detecting movement of at least one of a plurality of earth-working rollers of the earth-working roller assembly relative a frame member to which the earth-working roller assembly is connected and/or relative another earth-working roller. In addition or as an alternative, for one or more earth-working rollers movement relative to a support member or element of the earth-working roller assembly may be detected by one or more sensor devices.

The moving may comprise moving an earth-working roller system. The earth-working roller system may comprise an earth-working roller assembly, comprising: a first earth-working roller member and a second earth-working roller member; and a first support member and a second support member, the first and second support members supporting the first and second earth-working rollers on opposite sides in a relative position and allowing free rotation of the first and second earth-working rollers. Further, earth-working roller system may comprise a frame member; and a joint assembly connecting the earth-working roller assembly and the frame member, the joint assembly being adapted to allow rotational movement of the earth-working roller assembly relative to the frame member.

The detecting of sensor signals may comprise detecting sensor signals for the oscillating movement by an angle sensor.

The method may further comprise detecting sensor signals for the oscillating movement by an angle sensor placed aligned with a pivot point in which the earth-working roller assembly couples to the frame member. As an alternative or in addition, a linear sensor device may be applied for detecting sensor signals indicative of a linear movement.

The detecting of sensor signals may comprise detecting sensor signals for the oscillating movement by a position sensor. The position sensor may be adapted to detect position data for one or more members or parts of the earth-working roller system, for example, movement of the part or element relative to starting position of the part or element or movement relative to some other part or element. Such position signals are to be distinguished from the position or location data gathered for the movement of the of the earth-working roller system over the field.

The method may further comprise detecting sensor signals for the oscillating movement by a position sensor placed between the earth-working roller assembly and the frame member.

The method may further comprise detecting sensor signals for the oscillating movement by a position sensor integrated in an actuator member.

The detecting of sensor signals may comprise detecting sensor signals for the oscillating movement by a force sensor.

The method may comprise detecting sensor signals for the oscillating movement by located in a fixation of an actuator member.

The detecting of sensor signals may comprise detecting sensor signals for the oscillating movement by a pressure sensor.

One or more of the sensor devices may be provided in different locations on the earth-working roller system for detecting one or more signals which are to be assigned to the location signals. Use of a plurality of sensor devices providing different sensor signals indicative of different movement information may improve quality of the digital map.

Following, with regard to the earth-working roller system which may be applied are disclosed. The earth-working roller system may also be referred to as soil-working roller system.

According to an aspect, an earth-working roller system for an agricultural machine is provided, the earth-working roller system comprising an earth-working roller assembly. The earth-working roller assembly comprises a first earth-working roller member and a second earth-working roller member, and a first support member and a second support member. The first and second support members are supporting the first aid second earth-working rollers on opposite sides in a relative position and are allowing free rotation of the first and second earth-working rollers. The earth-working roller system is further comprising a frame member, and a joint assembly connecting the earth-working roller assembly and the frame member. The joint assembly is adapted to allow rotational or pivotal movement of the earth-working roller assembly relative to the frame member. Further, there is a first adjustment mechanism adapted to adjust a movement limitation for the rotational or pivotal movement of the earth-working roller assembly relative to the frame member.

The agricultural machine may be an implement. The agricultural machine may comprise at least one of: cultivator, seeder, tine harrow, disc harrow, seedbed harrow, subsoiler, plough, and chopper.

The first adjustment mechanism allows for improved control with regard to the operation of the earth-working roller system.

The first adjustment mechanism may be adapted to provide a first movement limitation and a second movement limitation different from the first movement limitation, wherein, for the rotational movement of the earth-working roller assembly relative to the frame member, the first movement limitation allows for rotational movement along a first circular arc section and the second movement limitation allows for the rotational movement along a second circular arc section different from the first circular arc section. The rotational or pivotal movement of the earth-working roller assembly relative to the frame member may be more limited with the second movement limitation applied. In this case the second circular arc is shorter or smaller than the first circular arc section.

The joint assembly may comprise a first joint member having a guiding opening and a second joint member having a guiding member, the guiding member being movable along the guiding opening during the rotational movement of the earth-working roller assembly relative to the frame member. The joint assembly is connecting or coupling the earth-working roller assembly to the frame member, thereby, allowing rotational or pivotal movement of the earth working roller assembly relative to the frame member. The guiding member received moveable along the guiding opening provides guiding while the earth-working roller assembly is moved relatively to the frame member in operation of the earth-working roller system. End sections of the guiding opening provide for movement limitations with regard to the guiding member received in the guiding opening, thereby, limiting the rotational movement of the earth-working roller assembly relative to the frame member.

One or more stop members may be releasably provided in the guiding opening. The one or more stop members may be defining a shortened trajectory compared to a (non-shortened) trajectory provided for the guiding member in the guiding opening without having the one or more stop members releasably provided in the guiding opening. The one or more stop members may comprise one or more stop pins which can be releasably mounted, for example, by screwing or sliding in. More than one stop members may be provided in the guiding opening.

The stop members may provide for limiting points along the trajectory provided for the guiding member in the guiding opening.

The one or more stop members releasably provided in the guiding opening may be adapted to limit, with regard to a starting position of the earth-working roller assembly relative to the frame member, rotational movement of the earth-working roller assembly relative to the frame member to at least one side. The one or more stop members may limit the trajectory for the relative movement between the earth-working roller assembly and the frame member compared to the case having no stop member provided in the guiding opening, thereby, shortening the trajectory of movement. The starting position not being an end position within the guiding opening may be a center position or a position adjacent to the center of the trajectory provided by the guiding opening. The one or more stop members may limit rotation into one direction of rotation or both opposite directions of rotation.

The one or more stop members releasably be provided in the guiding opening may be adapted to prevent, with regard to the starting position of the earth-working roller assembly relative to the frame member, rotational movement of the earth-working roller assembly relative to the frame member to at least one side. In such embodiment there is no rotational movement (rotation) possible for the relative movement between the roller assembly and the frame member to this side of the starting position. The relative rotational movement may be prevented or blocked for both directions of rotation with regard to the starting position.

The one or more stop members releasably be provided in the guiding opening may be adapted to allow, with regard to the starting position of the earth-working roller assembly relative to the frame member, rotational movement of the earth-working roller assembly relative to the frame member to an opposite side.

An actuator member may functionally be connected to the joint assembly, the actuator member allowing the rotational movement of the earth-working roller assembly relative to the frame member. The actuator member does allow rotational or pivotal movement of the earth-working roller assembly relative to the frame member. However, the actuator member may be operated for not allowing the rotational movement of the earth-working roller assembly relative to the frame member in an alternative operation mode. The actuator member may be applied in combination with the embodiment in which the joint assembly is provided with the first and second joint members. Alternatively, the actuator member may be provided for exclusively providing the first adjustment mechanism, specifically, without having applied the first and second joint members having the guiding opening and the guiding member, respectively.

The actuator member may be adapted to attenuate the rotational movement of the earth-working roller assembly relative to the frame member.

The actuator member may be adapted to limit the rotational movement of the earth-working roller assembly relative to the frame member. The actuator member may be provided in different operation modes, the different operation modes providing different limitations for or limits to the rotational movement of the earth-working roller assembly relative to the frame member.

The actuator member may comprise at least one of the following: a hydraulic actuator adapted to provide a hydraulic force, a mechanical actuator adapted to provide a mechanical force such as a mechanical force such as a spindle member, and/or a spring member, a magnetic actuator adapted to provide a magnetic force, a pneumatic actuator adapted to provide a pneumatic force, and an electric actuator adapted to provide an electric force.

With regard to the earth-working roller system, a second adjustment mechanism may be provided. The second adjustment mechanism may be adapted to adjust the relative position of the first and second earth-working roller members supported on the first and second support members. The second adjustment mechanism allows for adjusting the relative position of the first and second earth-working rollers. The second adjustment mechanism may comprise at least one of the following: a plurality of holes for providing support for the first and second earth-working roller members, guiding openings or holes, and a support member rotatably received on a base support member. The support members may provide for adjustment of the relative position of the first and second earth-working roller members by rotational or pivotal movement of the support members relative to each other.

The second adjustment mechanism may be adapted to adjust a distance between a first axis of rotation for the first earth-working roller member and a second axis of rotation for the second earth-working roller member. The adjustment of the distance between the first axis of rotation for the first earth-working roller member and the second axis of rotation for the second earth-working roller member may be applied for providing or preventing overlapping between the first and second earth-working roller member. Also, a degree of overlapping may be adjusted.

On opposite sides of the first and second earth-working rollers of the earth-working roller system, for both the first and second support members a first support element holding the first earth-working roller may be provided on the frame member. A second support element holding the second earth-working roller may provided on the support member. The first and second support elements are pivotably connected through the joint assembly. For the first and second support elements relative rotational movement may be allowed by the joint assembly. An actuator may be provided for adjusting the joint assembly, thereby, adjusting rotational positioning of the first and second support elements on the opposite sides. In turn, such adjustment will adjust the relative positioning/relative movement of the first and second earth-working rollers.

The first and second support elements may be pivotable around an axis extending through a pivot point. An actuator may be assigned to the pivot point and adapted to adjust a relative position of the first and second support members. The actuator may be at least one of a hydraulic actuator, an electric actuator, and a mechanical actuator.

The first and second earth-working roller members may be selected from the following group of earth-working roller members: rolling baskets, rotors, conditioners, and packers. The first and second earth-working roller members may be surface earth-working roller members rolling on the surface of the field, such surface earth-working roller members not penetrating into the earth while being moved or rolled over the field.

In an alternative embodiment, an earth-working roller system for an agricultural machine may be provided, comprising an earth-working roller assembly. The earth-working roller assembly may comprise a first earth-working roller member and a second earth-working roller member; and a first support member and a second support member, the first and second support members supporting the first and second earth-working rollers in a relative position and allowing free rotation of the first and second earth-working rollers. The earth-working roller system may further comprise a frame member; and a joint assembly connecting the earth-working roller assembly and the frame member, the joint assembly being adapted to allow rotational movement of the earth-working roller assembly relative to the frame member. Further, a second adjustment mechanism may be provided, the second adjustment mechanism being adapted to adjust the relative position of the first and second earth-working roller members supported on the first and second support members. Such roller system may also be applied alone or in combination with another earth-working roller system for detecting the plurality of signals.

The earth-working roller assembly may comprise a draw bar or other frame member which may be extending transversely to a moving direction. The first and second support members may be fixedly connected to a first portion on one side of the draw bar and a second portion on an opposite side of the draw bar, respectively.

According to another aspect, an earth-working roller system for an agricultural machine may be provided, the earth-working roller system comprising an earth-working roller assembly. The earth-working roller assembly comprises a first earth-working roller member and a second earth-working roller member. A first support element is provided supporting the first earth-working roller on opposite sides and allowing free rotation of the first earth-working roller. A second support element is provided supporting the second earth-working roller on opposite sides and allowing free rotation of the second earth-working roller. The first and second support elements are connected by a joint assembly on the opposite sides of the earth-working rollers. The joint assembly is adapted to allow limited rotational or pivotal movement and/or block such rotational or pivotal movement of the first earth-working roller relative to the second earth-working roller. In such embodiment, the first and second support members each comprise first and second support elements pivotably connected. On opposite sides of the earth-working rollers, the first support elements holding the first earth-working roller are provided by frame members to which, via the joint assembly, the second support elements holding the second earth-working roller are pivotably connected. On each of opposite sides, the first and second support members holding the first and second earth-working rollers comprise parts or elements, namely the first and second support elements, pivotably connected. The joint assembly is adjustable for adjusting the rotational or pivotal movement of the first earth-working roller relative to the second earth-working roller in operation. Such roller system, alone or in combination with another earth-working roller system, may also be applied for detecting the plurality of signals.

DESCRIPTION OF FURTHER EMBODIMENTS

Following, embodiments are described with reference to figures. In the figures show.

Figure 1:
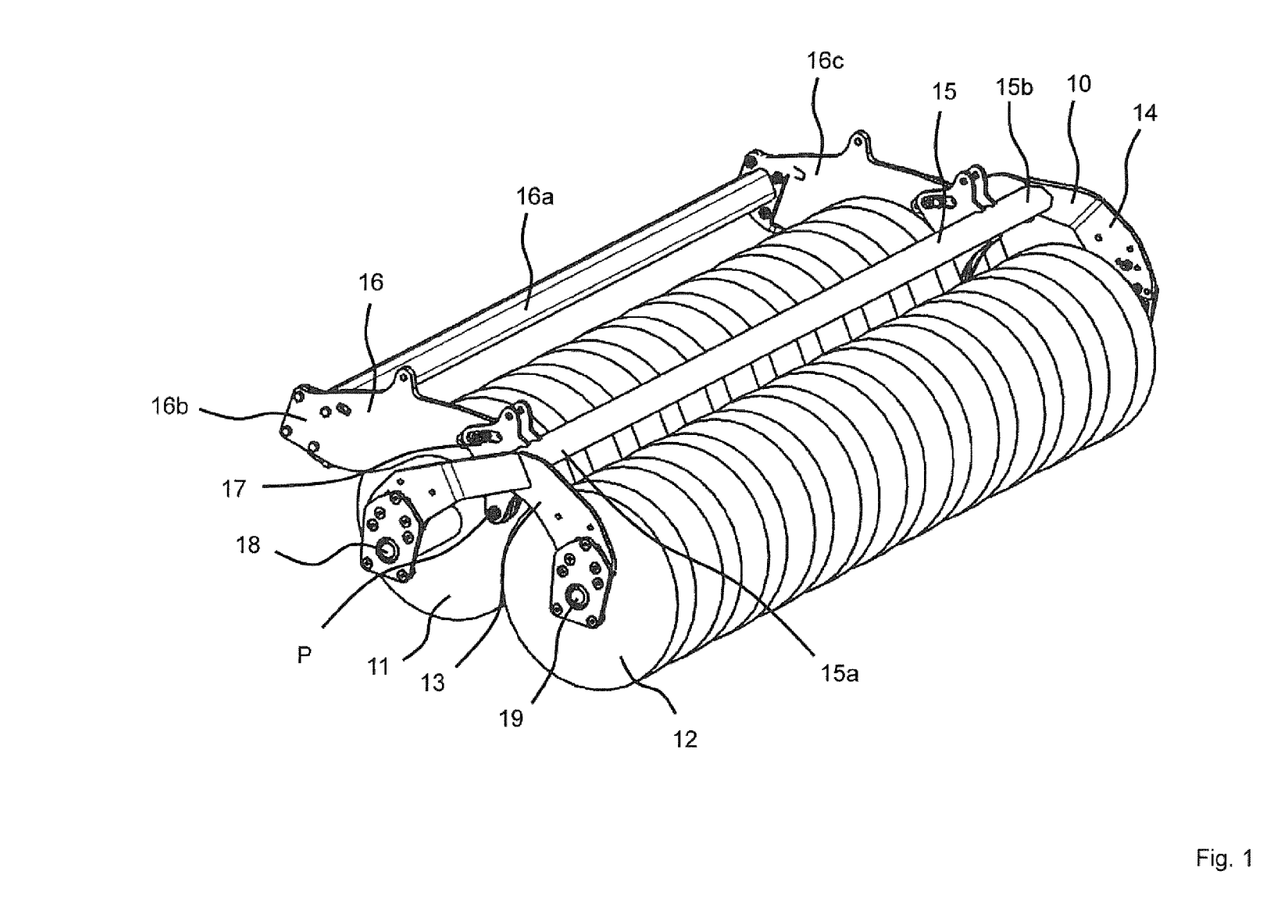
FIG. 1 a schematic perspective representation of an earth-working roller system for an agricultural machine such as an implement.
Figure 2:
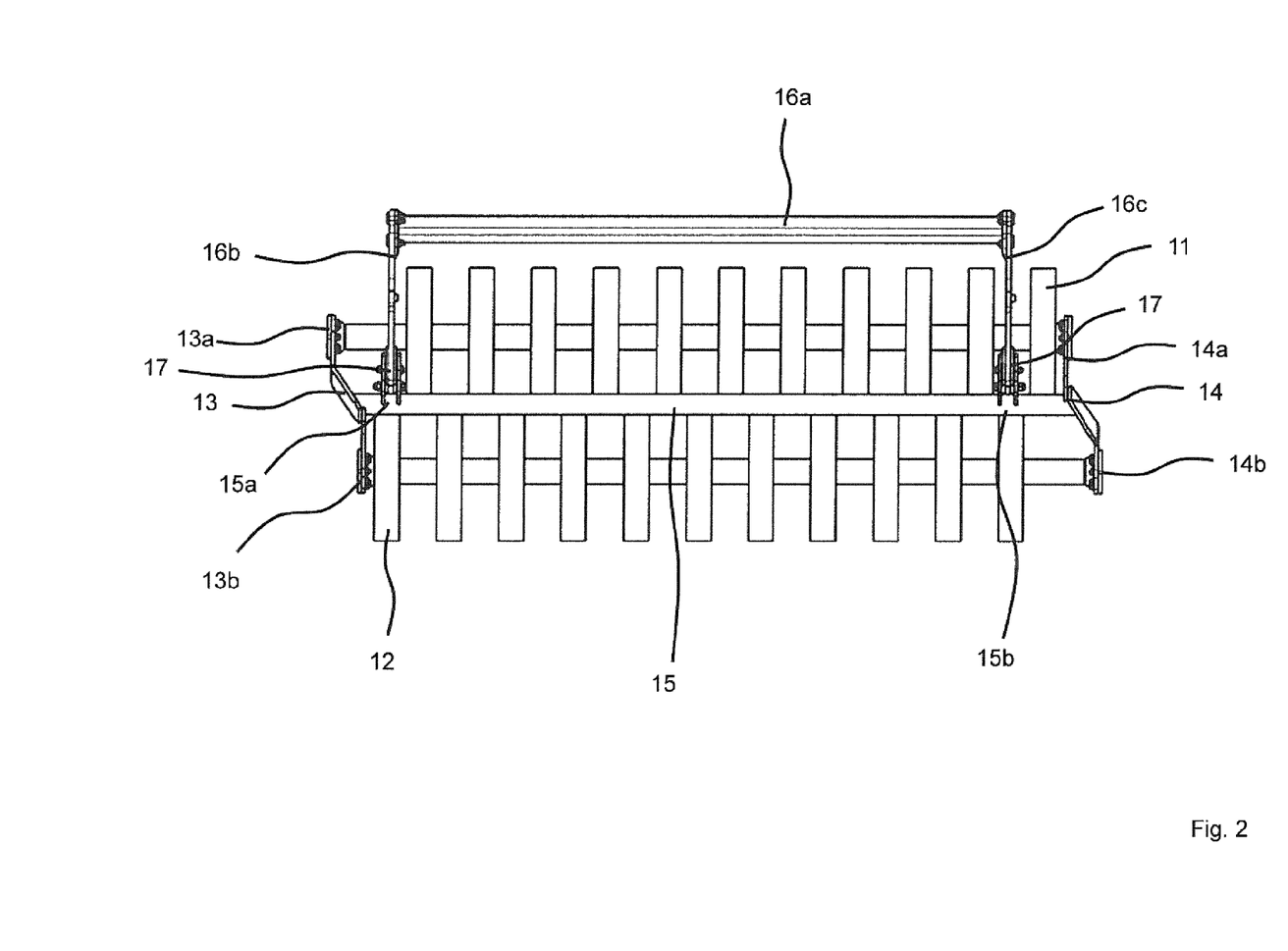
FIG. 2 a schematic representation of the earth-working roller system from FIG. 1 in a top view.

FIG. 1 and FIG. 2 show a schematic representations of an earth-working roller system comprising an earth-working roller assembly 10 having a first earth-working roller member 11 and a second earth-working roller member 12 which are supported by a first support member 13 and a second support member 14 fixedly connected to a draw bar 15. The earth-working roller system may also be referred to as a soil-working roller system.

The earth-working roller assembly 10 is mounted or coupled to a frame member 16 by means of a joint assembly 17. In the embodiment shown, the frame member 16 comprises another draw bar 16a, and a first further support member 16b and a second further support member 16c. The joint assembly 17 connecting to end sections 15a, 15b of the draw bar 15 allows for rotational or pivotal movement of the earth-working roller assembly 10 relative to the frame member 16 around a pivot point P.

Figure 3:
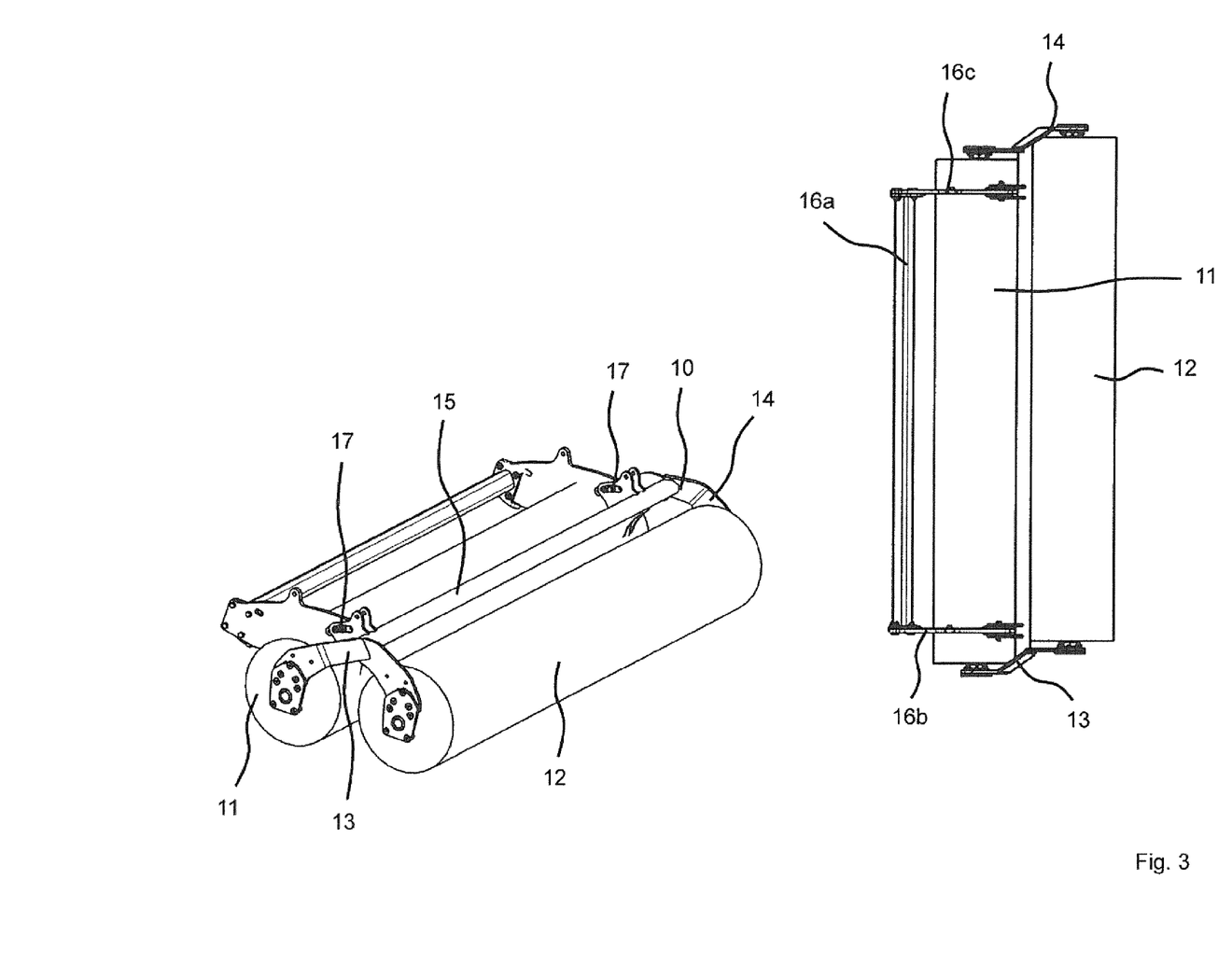
FIG. 3 schematic representations of another earth-working roller system.

FIG. 3 shows another embodiment of an earth-working roller system for an agricultural machine such as an implement.

By the first and second support members 13, 14 a first axis of rotation 18 of the first earth-working roller member 11 and a second axis of rotation 19 of the second earth-working roller member 12 are held in a relative position. Such relative position can be adjusted as will be explained below. Alternatively, the relative position may not be adjustable (fixed) in other embodiments.

Figure 4:
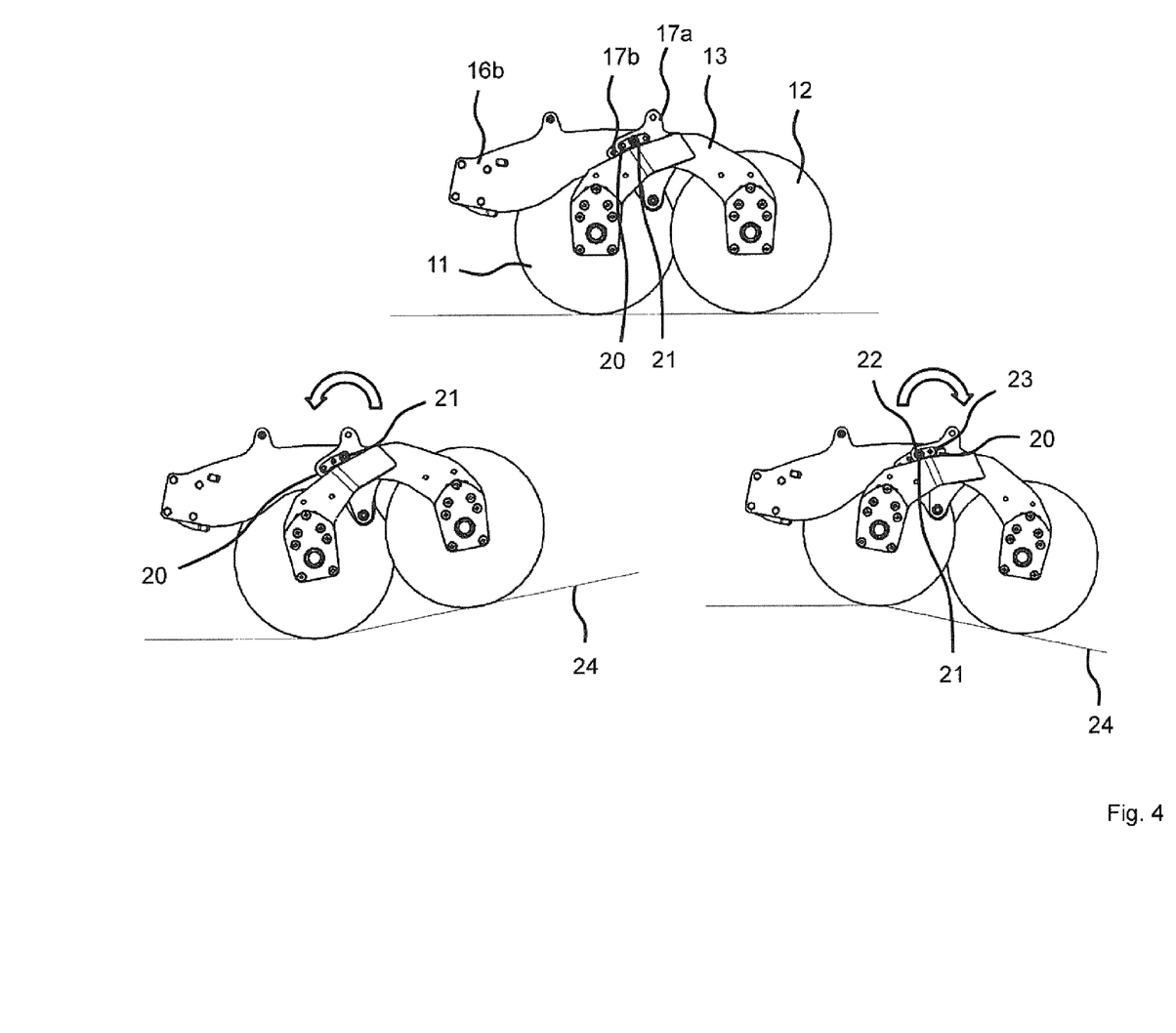
FIG. 4 schematic representations of a section view of the earth-working roller system with a joint assembly.

FIG. 4 shows schematic representations of a section of the earth-working roller system with the joint assembly 17. There is a first joint member 17a having a guide opening 20 and a second joint member 17b provided with a guide or guiding member 21 which is received in the guide opening 20. In case of relative (rotational or pivotal) movement between the frame member 16 and the earth-working roller assembly 10 the guide member 21 will be moved within the guide opening 20. End sections 22, 23 of the guide opening 20 provide limitation for the rotational or pivotal movement of the earth-working roller assembly 10 relative to the frame member 16. This can be seen from the lower representations in FIG. 4 showing different positions during the rotational movement of the earth-working roller assembly 10 relative to the frame member 16 depending a slope of the ground or soil 24 on which the first and second earth-working roller members 11, 12 are moving in operation.

Figure 5:
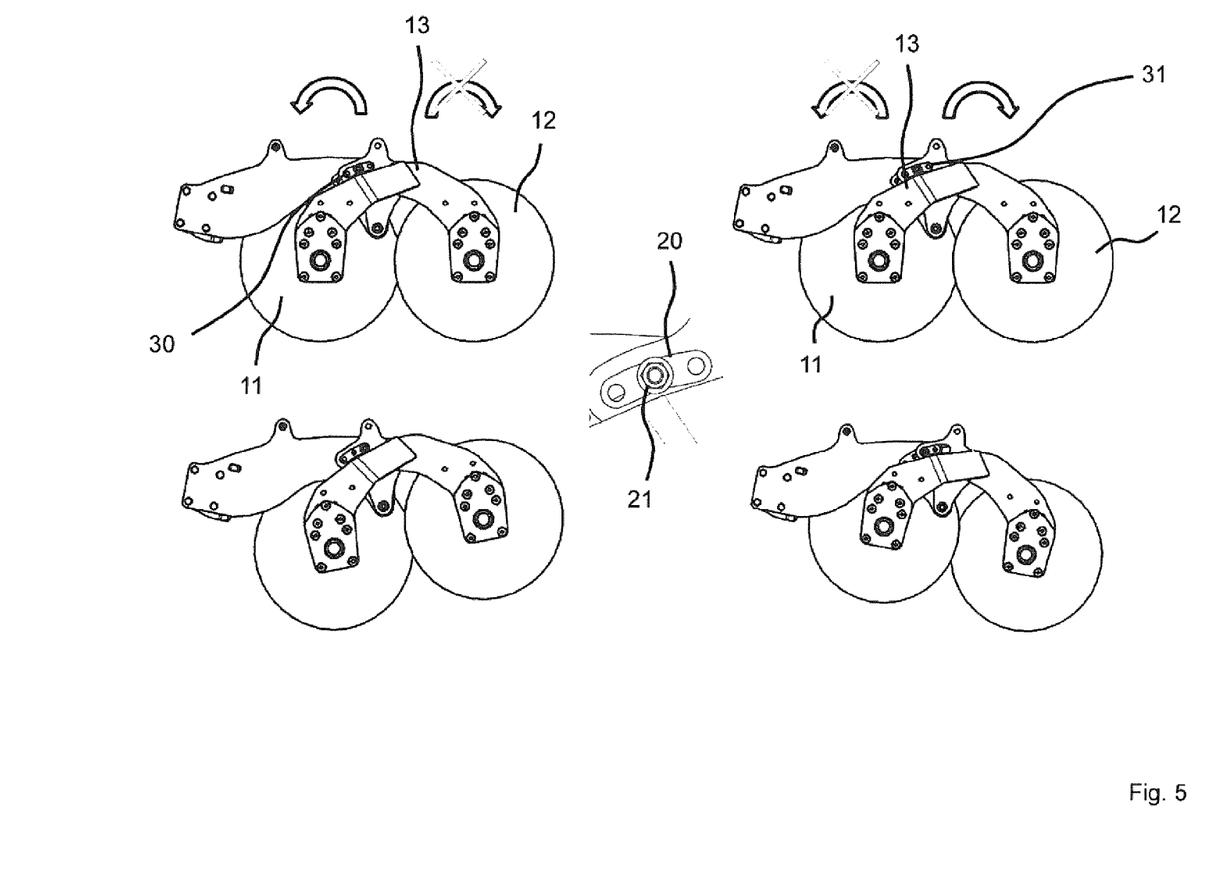
FIG. 5 schematic representations of the section view from FIG. 4.

According to the representation in FIG. 5 the rotational movement of the earth-working roller assembly 10 relative to the frame member 16 can be limited by releasably positioning stop members 30, 31 such as stop pins in the guide opening 20. In an alternative embodiment, the earth-working roller assembly 10 is prevented or blocked from rotational movement relative to the frame member 16.

Figure 6:
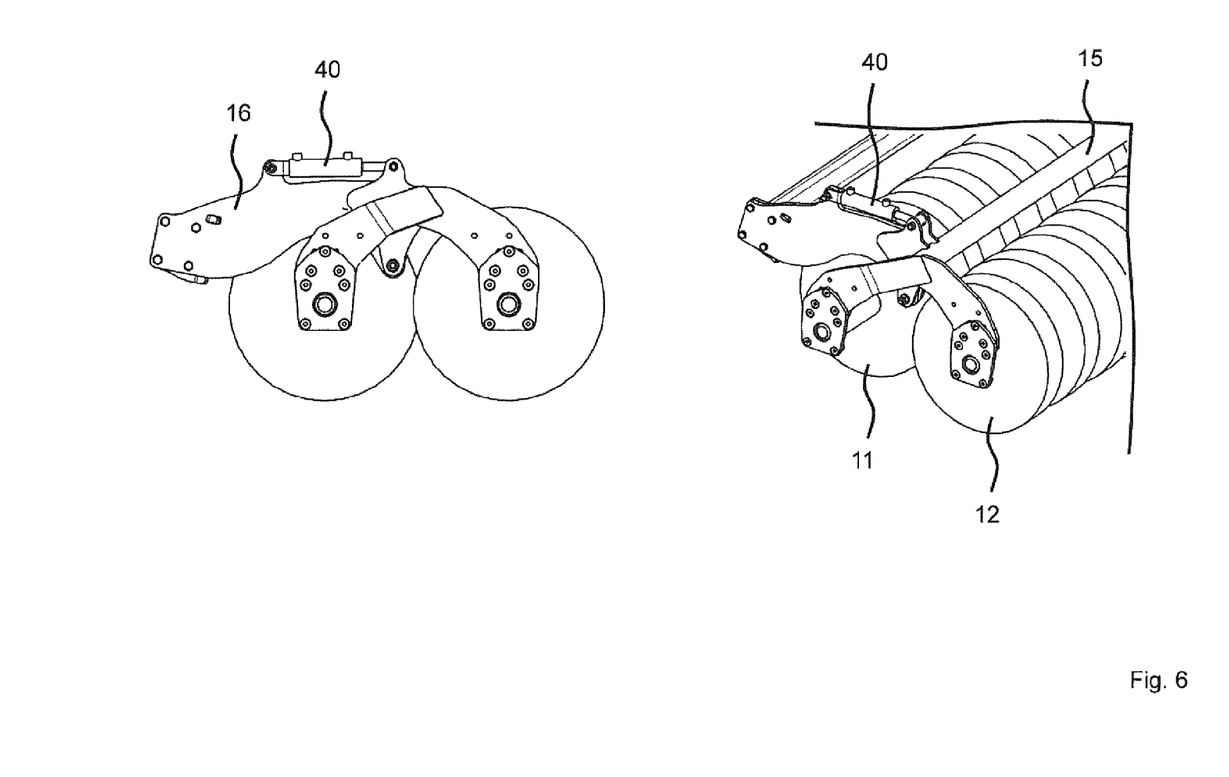
FIG. 6 a schematic representation of another embodiment provided with an alternative design for the joint assembly.

Referring to FIG. 6, an actuator member 40 is provided as part of the join assembly 17, the actuator member 40 functionally coupling to the frame member 16 and the earth-working roller assembly 10. The joint assembly 17 is provided with an alternative design compared to the embodiments in FIGS. 1 to 5. However, the joint assembly 17 shown for the embodiments in FIGS. 1 to 5 may be combined with the actuator member 40 in an alternative embodiment.

The guide opening 20 and the guide member 21 optionally to be combined with the one or more stop members 30, 31 may be part of a first adjustment mechanism adapted for adjusting limitation of the rotational movement of the earth-working roller assembly 10 relative to the frame member 16. As an alternative or in combination, the actuator member 40 may be part of or provide for the first adjustment mechanism.

Figure 7:
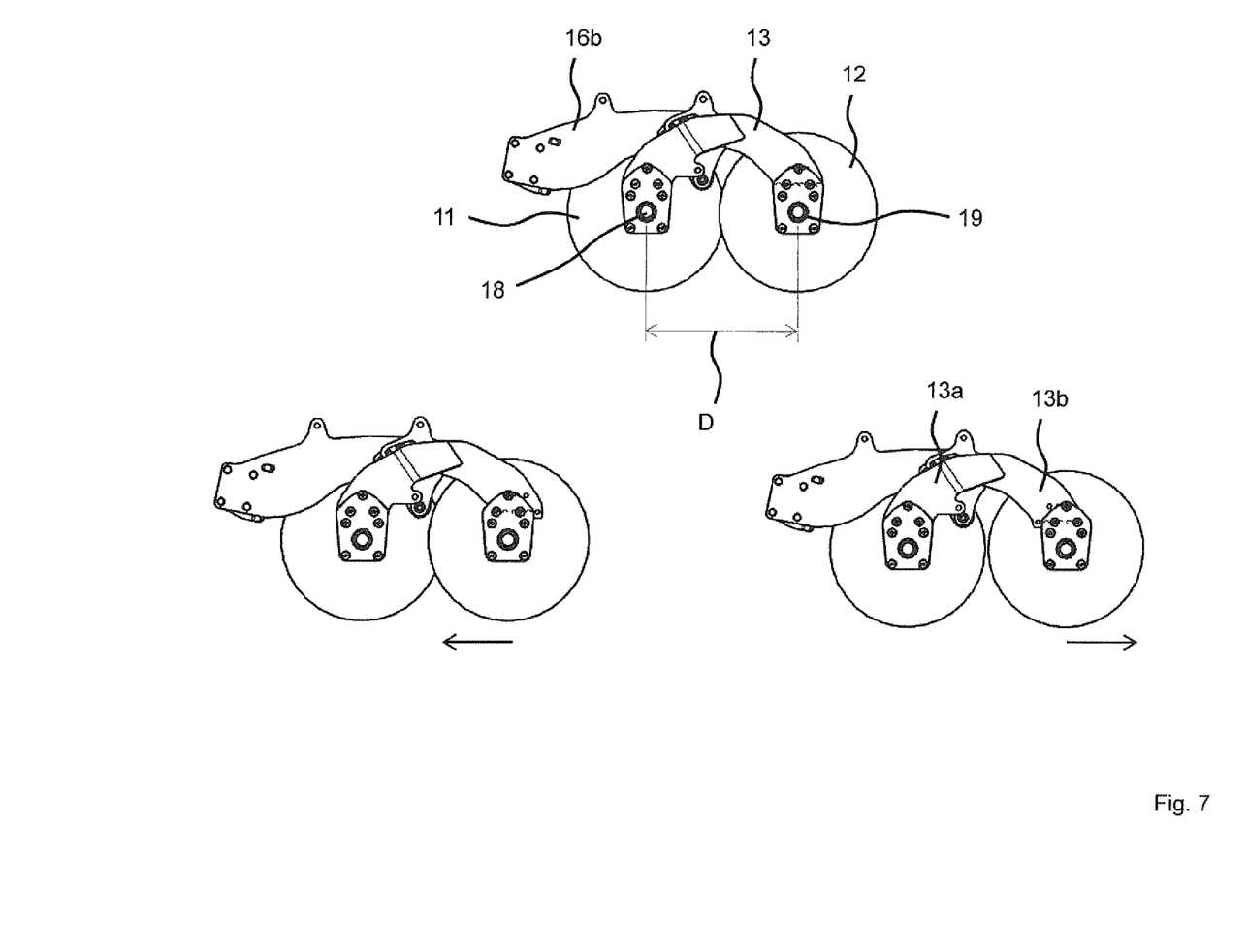
FIG. 7 schematic representation of a section view of the earth-working roller system with the joint assembly.
Figure 8:
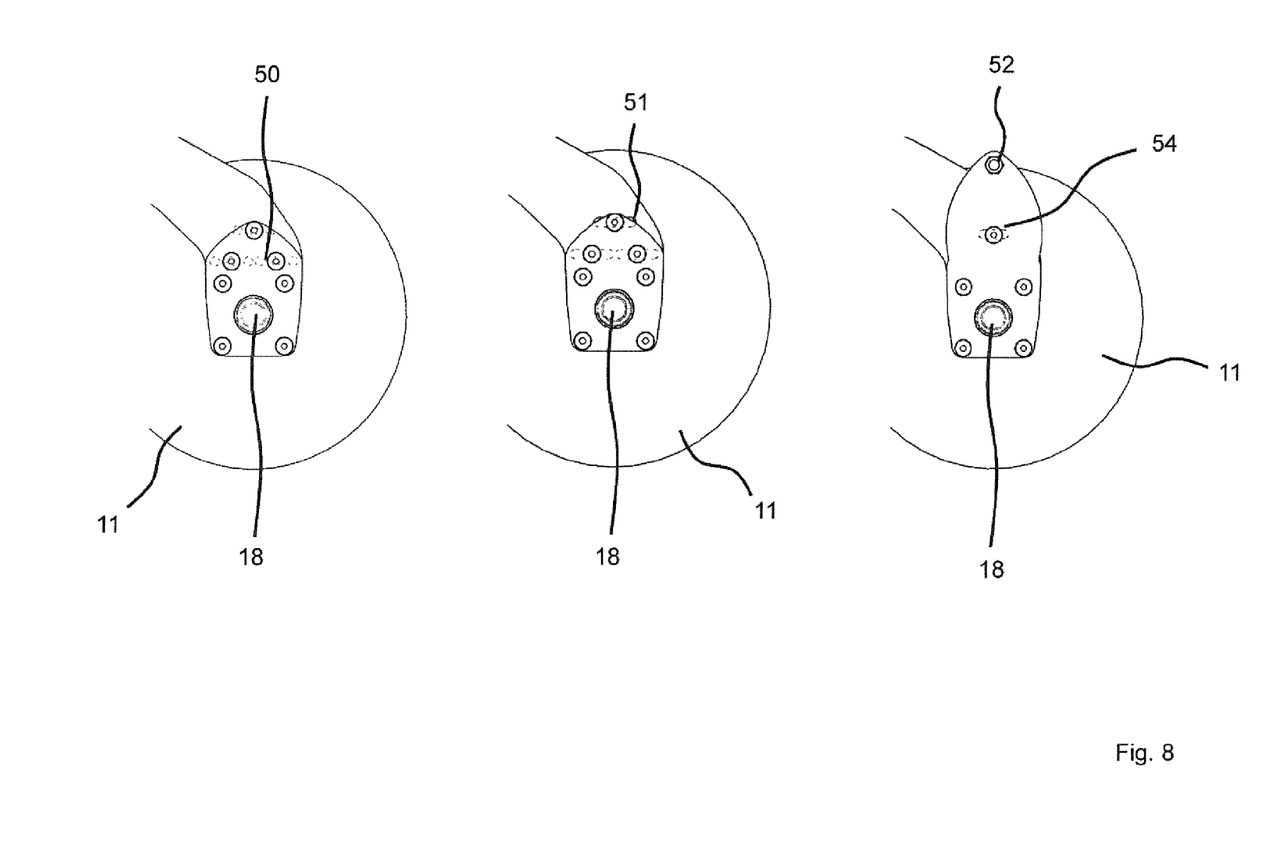
FIG. 8 a schematic representation of further details of the section view in FIG. 7.
Figure 9:
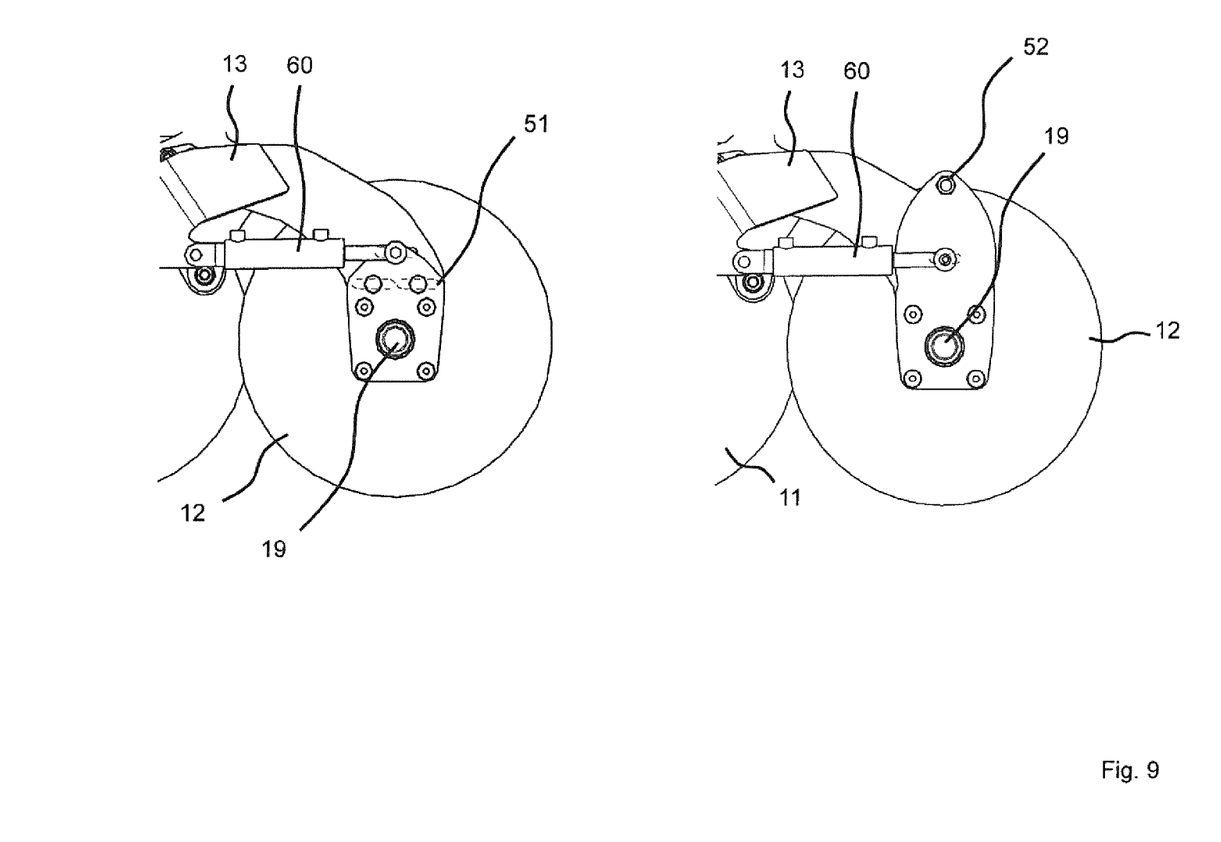
FIG. 9 a schematic representation of the section view with further details.

Referring to FIGS. 7 to 9, a second adjustment mechanism is provided which allows for adjusting a distance D between the first and second axis of rotation 18, 19. According to FIG. 8, there may be a plurality of holes 50, or guiding holes 51. Also, in another embodiment a pivot point 52 may be combined with a guiding hole 54 for adjusting location of the first axis of rotation 18. Similar options for adjustment will apply to the second axis of rotation 19. First and second support elements 13a, 13b of the first support member 13 are fixedly connected to the draw bar 15, similarly first and second support elements 14a, 14b of the second support member 14 (see FIG. 2).

In a further embodiment, see also FIG. 9, there may be an additional actuator member 60 for providing a force for adjustment of the distance D between the first axis of rotation 18 of the first earth-working roller member 11 and the second axis of rotation 19 of the second earth-working roller member 12.

Figure 10:
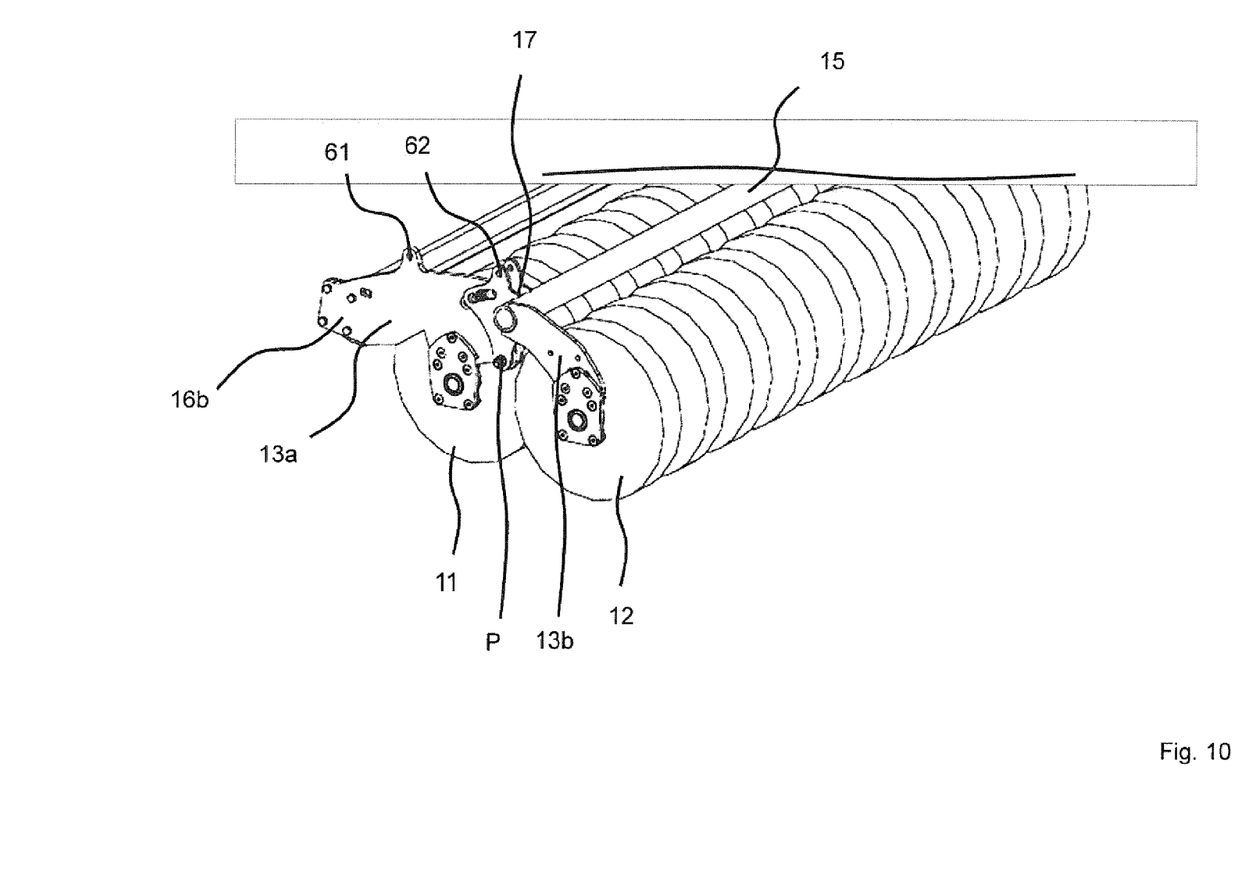
FIG. 10 a schematic perspective representation of a further earth-working roller system.
Figure 11:
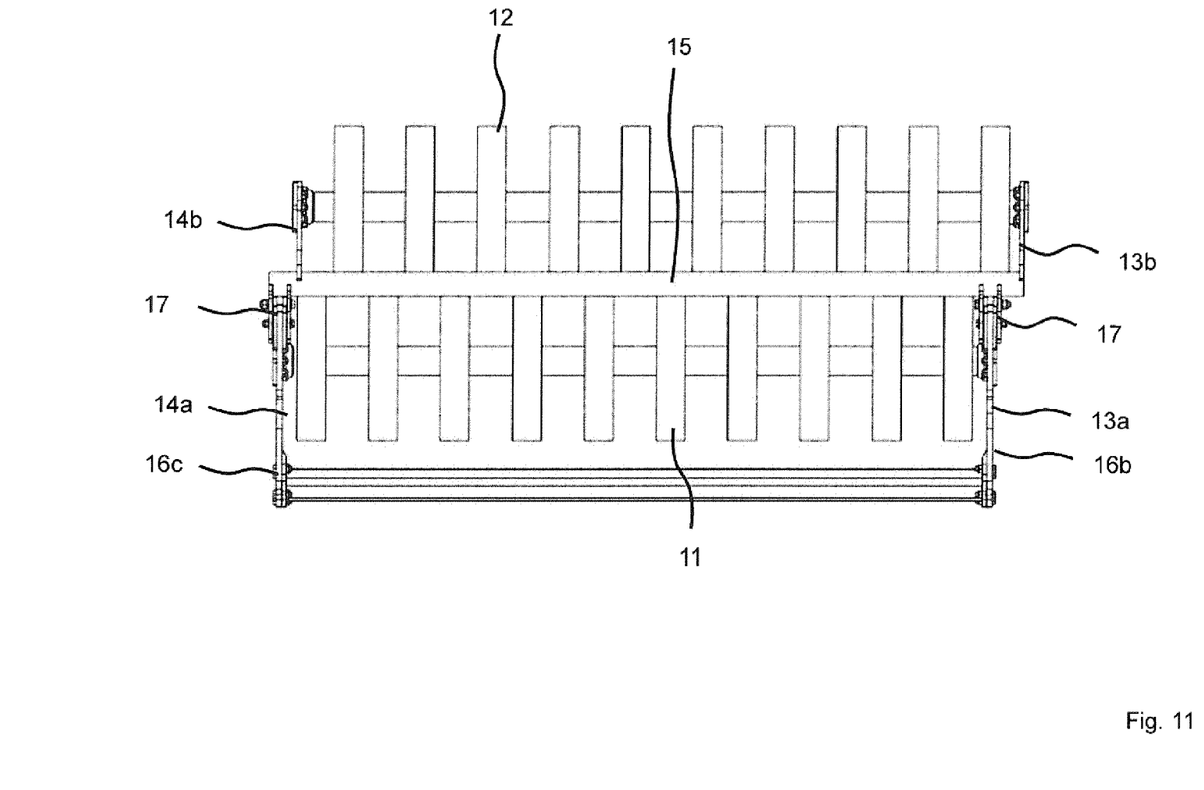
FIG. 11 schematic representations of the further earth-working roller system in FIG. 10.

FIGS. 10 and 11 show schematic representations of a further earth-working roller system. The first and second support members 13, 14 each are provided with the first support element 13a, 14a and the second support element 13b, 14b. The first support elements 13a, 14a holding the first earth-working roller 11 are provided by or on the frame elements 16b, 16c. The second support elements 13b, 14b are each received in a fixed position on the end sections 15a, 15b of the draw bar 15. The first and second support elements 13a, 14a; 13b, 14b are pivotably connected through the joint assembly 17 which is adjustable as it has been described above. Similar to the actuator 40 an actuator (not shown) may connect to connecting point 61, 62 on the first and second support elements 13a, 14a; 13b, 14b.

The different options for adjustment described above, as a single measure for adjustment or in combination, may apply to the further embodiment in FIGS. 10 and 11 mutatis mutandis.

Figure 12:
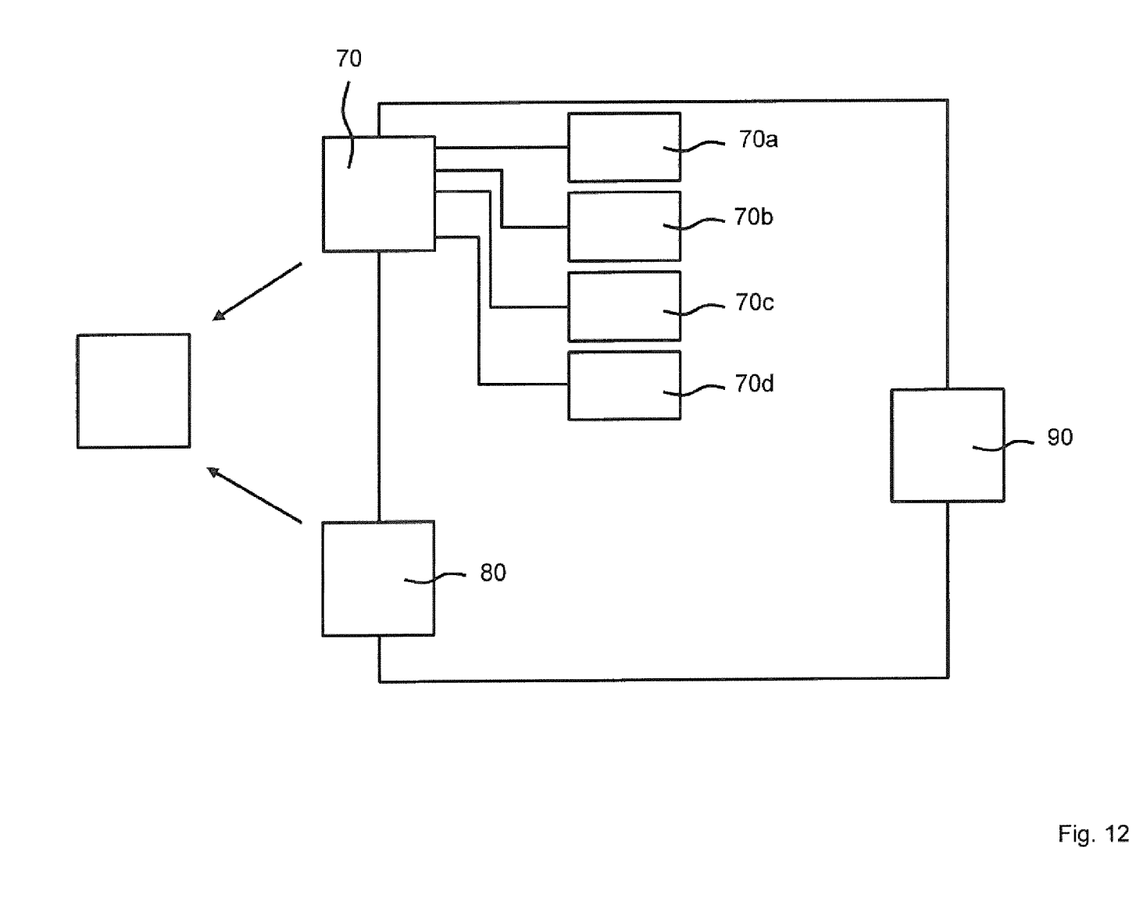
FIG. 12 a schematic representation of a system for detecting operation data for earth-working roller system.

FIG. 12 shows a schematic representation of a system for detecting operation data for the earth-working roller system. When the earth-working roller system is moving on the ground 24, articulation will be oscillating depending on soil or ground roughness. Such oscillation will be detected by a sensor device 70. The oscillation allows for determining information on soil roughness and soil leveling at the back of the agricultural machine provided with the earth-working roller assembly 10. For example, stony areas of the ground 24 can be determined from measurement signals detected by the sensor device 70.

With regard to the sensor device, an angle sensor 70a can be placed aligned with a pivot point in which the earth-working roller assembly 10 couples to the frame member 16 to measure angle oscillation.

As an alternative or in addition, a position sensor 70b can be placed between the earth-working roller assembly 10 couples to the frame member 16.

Further, as an alternative or in addition, a position sensor can be integrated in the actuator member 40. Such position sensor 70c and give desired information when actuator member 40 is not activated and free to follow soil contour.

A force sensor 70d may be located in a fixation of the actuator member 40 to measure load variation instead of oscillation and then get a similar info of soil roughness.

In case of the actuator member 40 being provided as a fluid actuator, a pressure sensor can be used to measure force variation on the actuator member 40. Further, as an alternative or in addition, a gravity sensor can be used to measure the acceleration of movable parts of the earth-working roller assembly 10 and thus determine the soil roughness/leveling. An acceleration sensor (for the vertical part) and/or a vibration sensor can be placed in different locations on the earth-working roller assembly 10, such sensor location allowing detection of sensor signals indicating movement of the some element or part of the earth-working roller assembly 10 due to movement over the soil.

The data or information determined from the measurement signals detected by the sensor device 70 may be combined with position data from a position sensor device 80, such as GPS (Global Positioning System) sensor. Data processing for the combination of the information may be performed by a data processing device 90, for example, a remote server device which as adapted to exchange data with the sensor device 70 and the position sensor device 80.

Thereby, it will be possible to generate a digital map with roughness and leveling information of the ground 24, such roughness and leveling information assigned to position data which may be detected while the measurement signals are detected by the sensor device 70. For example, position data indicative of a position on the field over which the earth-working roller assembly 10 moved may be assigned one or more sensor signals and/or roughness and leveling data derived from processing the sensor signal(s). A sensor signal height may be indicative of a level of roughness. Such level of roughness may be assigned to position data, thereby, generating the digital map.

Further operations like additional tillage, seeding, planting or the like can be optimized by using such digital map. For example, additional tillage may only be applied in an area of the field or ground where needed. Additional tillage may be applied with adjustments adapted to soil roughness previously measured, for example, forward speed with power harrow. A seed-rate adjustment may be applied according soil roughness. As a consequence, possible loss at the emergence may be reduced. As an alternative or in addition, speed adjustment of planting may be applied in dependence on the digital map.

The detecting of the sensor data for the earth-working roller system in operation and combining such data with positioning information is independent of the actual design of the earth-working roller system and may apply to systems different from the one described here.

One or more of the earth-working roller systems disclosed above may advantageously be applied for detecting the signals. But, other earth-working roller systems provided with one or more of the sensor devices may also be used for the measurement of the signals.

The features disclosed in this specification, the figures and/or the claims may be material for the realization of various embodiments, taken in isolation or in various combinations thereof.

The invention claimed is:

1. A method for determining and storing surface conditions for a field, comprising:
   moving an agricultural machine having an earth-working roller system over a field, the earth-working roller system comprising an earth-working roller assembly;
   providing one or more sensors;
   detecting sensor signals for an oscillating movement of the earth-working roller assembly;
   detecting position data for the movement of the earth-working roller system over the field;
   generating a digital surface map for the field indicative of position-dependent roughness and/or leveling information, the generating comprising assigning the sensor signals to the position data; and
   storing the digital surface map in a data storage device.

2. The method according to claim 1, wherein the moving comprises moving an earth-working roller system, comprising:
   an earth-working roller assembly, comprising
      a first earth-working roller member and a second earth-working roller member; and
      a first support member and a second support member, the first and second support members supporting the first and second earth-working rollers on opposite sides in a relative position and allowing free rotation of the first and second earth-working rollers;
   a frame member; and
   a joint assembly connecting the earth-working roller assembly and the frame member, the joint assembly being adapted to allow rotational movement of the earth-working roller assembly relative to the frame member.

3. The method according to claim 2, further comprising detecting sensor signals for the oscillating movement by an angle sensor placed aligned with a pivot point in which the earth-working roller assembly couples to the frame member.

4. The method according to claim 2, further comprising detecting sensor signals for the oscillating movement by a position sensor placed between the earth-working roller assembly and the frame member.

5. The method according to claim 2, further comprising detecting sensor signals for the oscillating movement by a position sensor integrated in an actuator member.

6. The method according to claim 2, further comprising detecting sensor signals for the oscillating movement by located in a fixation of an actuator member.

7. The method according to claim 1, wherein the detecting of sensor signals comprises detecting sensor signals for the oscillating movement by an angle sensor.

8. The method according to claim 1, wherein the detecting of sensor signals comprises detecting sensor signals for the oscillating movement by a position sensor.

9. The method according to claim 1, wherein the detecting of sensor signals comprises detecting sensor signals for the oscillating movement by a force sensor.

10. The method according to claim 1, wherein the detecting of sensor signals comprises detecting sensor signals for the oscillating movement by a pressure sensor.

11. A system for determining and storing surface conditions for a field, comprising:
   an agricultural machine having an earth-working roller system over a field, the earth-working roller system comprising an earth-working roller assembly;
   a measurement system, comprising a sensor system; and
   a data storage device;
   wherein the measurement system is adapted to
   detect sensor signals for an oscillating movement of the earth-working roller assembly while the agricultural machine is moving over a field;
   detect position data for the movement of the earth-working roller system over the field;
   generate a digital surface map for the field indicative of position-dependent roughness and/or leveling information, the generating comprising assigning the sensor signals to the position data; and
   store the digital surface map in the data storage device.

* * * * *